(12) United States Patent
Wong

(10) Patent No.: US 7,784,026 B1
(45) Date of Patent: Aug. 24, 2010

(54) WEB APPLICATION INTERNATIONALIZATION

(75) Inventor: Clement Wong, Bedford, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1819 days.

(21) Appl. No.: 10/164,322

(22) Filed: Jun. 5, 2002

(51) Int. Cl.
G06F 9/44 (2006.01)

(52) U.S. Cl. .................................. 717/109; 717/113

(58) Field of Classification Search ......... 717/103–109, 717/113, 114; 704/1–10, 277; 715/513, 715/516; 709/218
See application file for complete search history.

(56) References Cited

U.S. PATENT DOCUMENTS

| | | | |
|---|---|---|---|
| 6,981,212 B1* | 12/2005 | Claussen et al. | 715/513 |
| 6,996,520 B2* | 2/2006 | Levin | 704/10 |
| 2002/0049831 A1* | 4/2002 | Platner et al. | 709/218 |
| 2002/0123878 A1* | 9/2002 | Menke | 704/2 |
| 2002/0152063 A1* | 10/2002 | Tokieda et al. | 704/2 |
| 2003/0084401 A1* | 5/2003 | Abel et al. | 715/501.1 |
| 2003/0125972 A1* | 7/2003 | Luce et al. | 705/1 |
| 2003/0131316 A1* | 7/2003 | Brown et al. | 715/513 |
| 2004/0068411 A1* | 4/2004 | Scanlan | 704/277 |

OTHER PUBLICATIONS saki Itagaki, "Use XML as a Java Localization Solution" Page Last Updated: May 25, 2001, http://www.lisa.org/tmx/m-itagaki.html, pp. 1-4.*
"TMX Format Specifications" [online] [Retrieved On: Jul. 16, 2002] Retrieved from: http://www.lisa.org/tmx/tmx13.htm.
"Use XML as a Java Localization Solution" [online] [Retrieved On: Jul. 16, 2002] Retrieved from: http://www.lisa.org/tmx/m_itagaki.html.
"DeveloperWorks: Java Technology: Harnessing Internalization" [online] [Retrieved On: Jan. 8, 2001] Retrieved from: http://www-106.ibm.com/developerworks/library/j-rbmgr/index.html.
"Multilingual Webmaster>>Where the web Is headed" [online] [Retrieved On: Jul. 16, 2002] Retrieved from: http://www.multilingualwebmaster.com/library/trememories.html.
"The ELAN Slovene-English Aligned Corpus" [online] [Retrieved On: Jul. 16, 2002] Retrieved from: http://nl.ijs.si/et/Bib/MT99.
"Translation Aid Software" [online] [Retrieved On: Jul. 16, 2002] Retrieved from: http://www.accurapid.com/journal/03TM2.htm.
"Language Partners" [online] [Retrieved On: Jul. 16, 2002] Retrieved from: http://www.languagepartners.com/reference-center.
Isseroff, Ami. "Topic: Controlled Languages" TC Forum. (Mar. 1999) pp. 3-24.
Schaler, Reinhard. "New Media Localisation-LINGLINK Report for the European Commission DGXIII" (Jan. 1999) pp. 1-77.
Webb, Lynn E. "Advantages and Disadvantages of Translation Memory: A Cost/Benefit Analysis" (1998) pp. 1-60.

* cited by examiner

*Primary Examiner*—Anna Deng
(74) *Attorney, Agent, or Firm*—Kilpatrick Stockton LLP

(57) ABSTRACT

A system and method is described for internationalization of web pages by extracting translatable content from extensible mark-up language (XML), or similar data-centric meta-language representations of web pages or data used to build web pages. The extracted translatable content is stored in a translation task repository (TTR) accessible by the web developer and the translator. The XML representation is then modified to include selection control logic to select the appropriate translations for insertion into the final web page. The translator accesses the TTR to translate the appropriate content and saves the translations back to the TTR associated with the original translatable data. The translations are obtained from the TTR as selection cases for the selection control logic of the XML representation. As the XML is converted into the web source code, the selection logic and translations are embedded therein facilitating building the web site in multiple different languages.

22 Claims, 5 Drawing Sheets

```
                                                          10
                                                         /
    ┌──────────────────────────────────────────────────┐
    │ <?xml version="1.0" encoding="ISO-8859-1"?>      │
100─┤ <html xmlns="http://www.w3.org/1999/xhtml">      │
    │   <head>～101                                    │
    │     <title>A XML Document</title>～102           │
    │   </head>         \                              │
    │                   105                            │
    │   <body>                                         │
103─┤   <p>Hello World</p>～104                        │
    │   </body>         \                              │
    │                   106                            │
    │ </html>                                          │
    └──────────────────────────────────────────────────┘
```

FIG. 1
*(PRIOR ART)*

```
   20                                   Language=en_US
    \
    ┌──────────────────────────────────────────────┐
    │ <?xml version="1.0" encoding="ISO-8859-1"?>  │
    │ <html xmlns="http://www.w3.org/1999/xhtml">  │
    │   <head>                                     │
    │     <title>A XML Document</title>            │
    │   </head>                     Language=es_ES │
    │   <body>                                     │
    │     <p>Hello World</p>  ┌──────────────────────────────────────────────┐
    │   </body>               │ <?xml version="1.0" encoding="ISO-8859-1"?>  │
    │ </html>                 │ <html xmlns="http://www.w3.org/1999/xhtml">  │
    └─────────────────────────│   <head>                                     │
                              │     <title>Un Documento de XML</title>       │
                              │   </head>                                    │
                              │   <body>                                     │
         FIG. 2               │     <p>Hola Mundo</p>                        │
        (PRIOR ART)           │   </body>                                    │
                              │ </html>                                      │
                              └──────────────────────────────────────────────┘
                                                                            \
                                                                            21
```

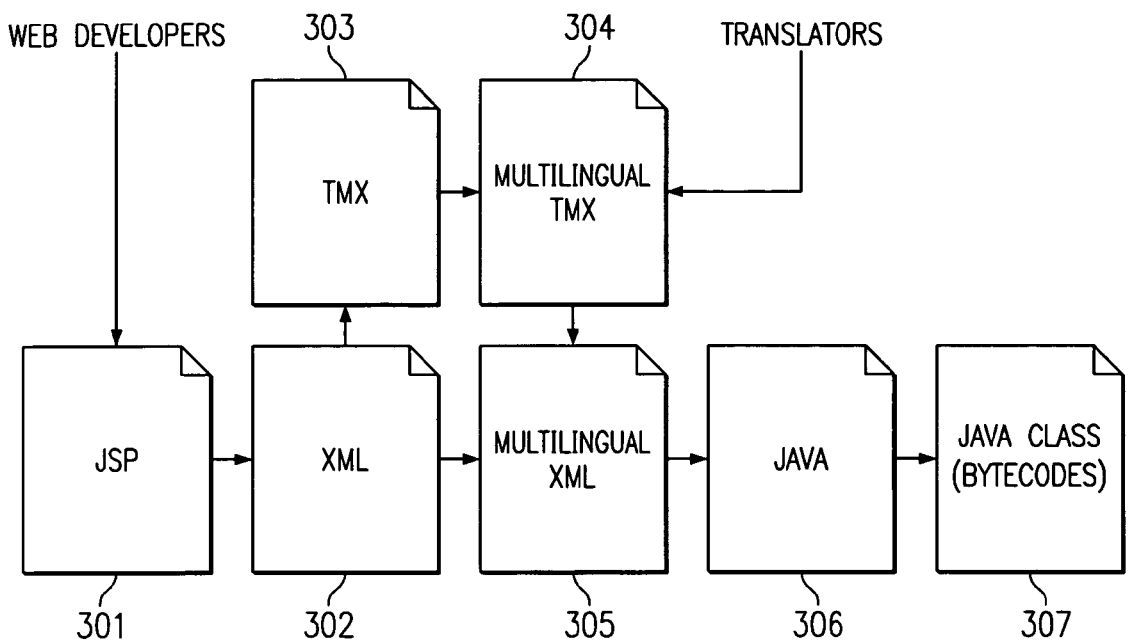
FIG. 3
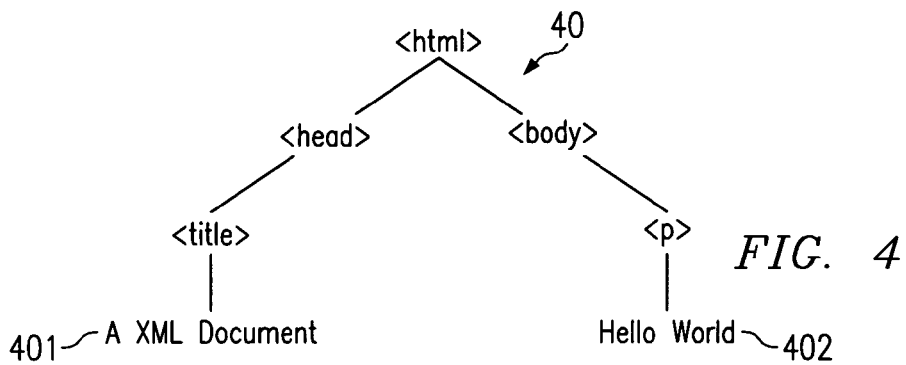
FIG. 4
```
<?xml version="1.0" encoding="UTF-8"?>
<tmx version="1.2">
   <header creationtool="CFMX" creationtoolversion="6.0" datatype="xml"
           segtype="sentence" adminlang="en-US" srclang="EN" o-tmf="">
   </header>
   <body>
   </body>
</tmx>
```
FIG. 5

```
                                                              60
<?xml version="1.0" encoding="UTF-8"?>
<tmx version="1.2">
   <header creationtool="CFMX" creationtoolversion="6.0" datatype="xml"
           segtype="sentence" adminlang="en-US" srclang="EN" o-tmf="">
   </header>
   <body>
      <tu tuid="1">                401
         <tuv lang="en_US"><seg>A XML Document</seg></tuv>  601
      </tu>
      <tu tuid="2">
         <tuv lang="en_US"><seg>Hello World</seg></tuv>  602
      </tu>                                402
   </body>
</tmx>
```

*FIG. 6*

```
                                                              60
<?xml version="1.0" encoding="UTF-8"?>
<tmx version="1.2">
   <header creationtool="CFMX" creationtoolversion="6.0" datatype="xml"
           segtype="sentence" adminlang="en-US" srclang="EN" o-tmf="">
   </header>
   <body>
      <tu tuid="1">
         <tuv lang="en_US"><seg>A XML Document</seg></tuv>  601
         <tuv lang="es_ES"><seg>Un Documento de XML</seg></tuv>  701
      </tu>
      <tu tuid="2">
         <tuv lang="en_US"><seg>Hello World</seg></tuv>  602
         <tuv lang="es_ES"><seg>Hola Mundo</seg></tuv>  702
      </tu>
   </body>
</tmx>
```

*FIG. 7*

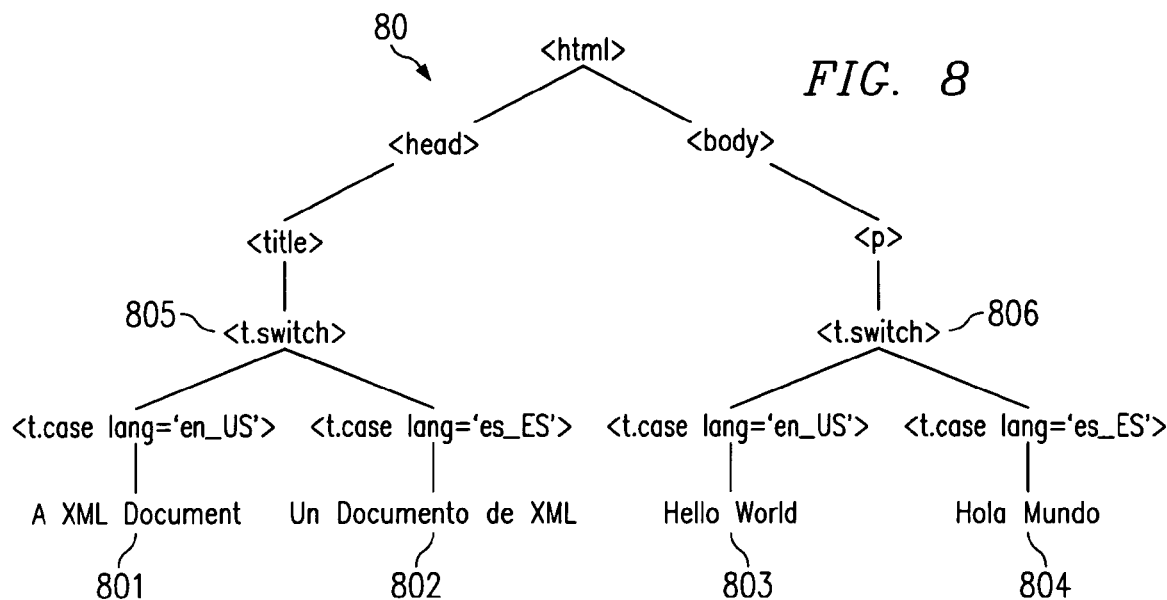

```
<?xml version="1.0" encoding="UTF-8"?>
<html xmlns="http://www.w3.org/1999/xhtml"
      xmlns:t="http://www.macromedia.com">
  <head>
    <title>
900⤴<t:switch>                                    901
        <t:case lang="en_US">A XML Document</t:case>
        <t:case lang="es_ES">Un Documento de XML</t:case>
      </t:switch>                                  902
    </title>
  </head>
  <body>
    <p>
      <t:switch>⤴903                               904
        <t:case lang="en_US">Hello World</t:case>
        <t:case lang="es_ES">Hola Mundo</t:case>
      </t:switch>                                  905
    </p>
  </body>
</html>
```
~90

```
print ("<?xml version='1.0' encoding='UTF-8'?>");
print ("<html xmlns='http://www.w3.org/1999/xhtml' ");
print ("      xmlns:t=http://www.macromedia.com'>");
print ("   <head>");
print ("      <title>");
switch  (getLocale())  ~1001
{            1011
case en_US: ~1002
    print ("A XML Document"); ~1004
    break;
case es_ES: ~1003
    print ("Un Documento de XML"); ~1005
    break;
}
print ("      </title>");
print ("   </head>");
print ("   <body>");
print ("      <p>");
switch  (getLocale()) ~1006
{            1011
case en_US: ~1007
    print ("Hello World"); ~1009
    break;
case es_ES: ~1008
    print ("Hola Mundo"); ~1010
    break;
}
print ("      </p>");
print ("   </body>");
print ("</html>");
```

*FIG. 10*

WEB APPLICATION INTERNATIONALIZATION

BACKGROUND OF THE INVENTION

With the unbelievable pace at which the Internet has grown over the last ten years, the business world has become integrally "wired" through e-commerce. As the reach and technology of the Internet increased, e-commerce became a natural extension of the old-business world. With this extension, the ability to market and sell goods and services across borders using the Internet became commonplace. However, as global e-commerce grows, new issues have emerged regarding the extension of an American-centric Internet to non-English speaking countries. In today's global village, web developers face the task of creating a new paradigm for the globalization of the Internet.

Much of the current discussion concerning web pages centers around the format in which electronic documents and programs are written. For example, Hypertext Mark-Up Language (HTML) is one of the languages that a programmer or web developer uses to design and present the format of a web site or web page. HTML is a tag-based, format-related language, meaning that specialized tags are used to "mark up" or format the content of the web pages (e.g., "<b> This text is bold. </b>" would trigger the browser to format the enclosed text in bold-face type). When the HTML document is communicated to a desktop browser, such as Microsoft's INTERNET EXPLORER™, Netscape's NETSCAPE NAVIGATOR™, or the like, it generally knows by reading the HTML tags how to render and configure the appearance of the information in the browser. HTML tags include content tags, which describe the format of the tagged content, and containment tags, which delimit areas of containment in the HTML document. Other markup languages such as Wireless Markup Language (WML) which is used mostly for wireless devices, like cell phones are also used by developers.

HTML is a sub-application of a much more extensive meta language (i.e., a language that uses meta data or tags to describe or mark-up data), Standard Generalized Mark-up Language (SGML). SGML was designed to be a standard way of marking up data and was used extensively in large document management systems. However, because of its intended universal application, SGML is a very complicated language and, consequently, not generally suitable for data interchange across the Internet. Its complexity typically requires large parsers which would not be efficient or compact enough for effective Internet use. HTML was developed to capture the information display aspect of SGML in a much more compact and efficient package.

In developing multinational web sites, web developers typically design web pages in a single "spoken" language. This is due to file encoding restrictions. If a developer writes a document in Japanese and saves that document using English encoding, the Japanese character coding is often altered, and the characters may not be properly displayed on subsequent accesses to that file. Therefore, documents written in a different language, other than Latin-1 encoded language, should generally be saved according to its own specific language encoding requirements. Because of these encoding restrictions, one web page must typically be created and stored for each different language desired.

In the early stages of the Internet, web sites and web pages typically delivered only static content (i.e., information that did not change on a regular basis). Information and format were simply hard-coded in pure HTML to be presented to and displayed by the browser. However, with the expansion of the Internet and e-commerce, most information is now delivered dynamically. For example, a web site may include a product catalog, a shopping cart, or a section of new product descriptions that may require continual update of the underlying information. Depending on the nature of the business, the information may change anywhere from every month, to as often as every hour or less. Dynamic/distributed systems were developed to facilitate the flexibility of such web sites by allowing the dynamic information to be placed into a database accessible by the web/application server and the web developer. These dynamic/distributed web pages are coded with HTML and may include executable code that would facilitate accessing the databases for the necessary dynamic information exchange. Such web pages are often referred to as server pages. Server pages, which reside and are executed on the server-side, typically comprise HTML or similar format-sensitive mark-up code with embedded executable source code, such as Sun's JAVA™, Macromedia's COLDFUSION™ Mark-up Language (CFML), or the like. The embedded source code is executed by the server to provide processing or database interaction. The processed data is then filled into the server page which is eventually constructed into the displayed web page using the HTML format-descriptive code.

With the proliferation of dynamic/distributed web sites, another SGML-subset meta language is seeing more application. Extensible Mark-up Language (XML) was created with the same purpose in mind as SGML, but without much of the same complexities. XML allows tagging or marking of data for providing description of and/or structure to the data as opposed to simply effecting the formatting of the data, as in HTML. XML is generally used to increase the functionality of the dynamic Internet. More and more web applications are taking advantage of XML's power and flexibility by using it to facilitate data interaction.

Another problem exists with the current systems and methods for providing multilingual web sites. Typically, as discussed above, a web site will be designed and developed in a single, primary "spoken" language. The web developers may code the entire web site in this primary language. Once the site has been developed, it is then typically given to a translator to translate it into each of the languages desired for support. The problem arises when the web site is very large. The translations of such sites require a considerable amount of time. Furthermore, with full access to the web site source code, there exists a chance the translator may unintentionally damage or destroy some of the source code. These problems may unfavorably delay the roll out of the web site, depending on which languages are desired, and/or whether any damage is done to the source code.

A common solution for this problem is to involve the translator in the development process at the early stages. However, because developers will typically continue to change and refine the content, design, and layout of web pages, the translator would typically need to continually update the translations. Translators usually charge based on the number of words translated. Therefore, requiring multiple re-translations during development may not be the most cost-effective means of obtaining multiple language support. Furthermore, it is currently not possible, in the traditional web development process, to preserve previous translation to minimize subsequent translations.

BRIEF SUMMARY OF THE INVENTION

The present invention is directed to a system and method for optimizing the internationalization of web pages to, among other things, eliminate the need to maintain multiple copies of the web site. The system and method are directed to converting a single language document into a binary executable form by injecting multiple translations into the executable. One embodiment of the present invention optimizes internationalization by preferably extracting translatable content from XML or similar data-descriptive meta-language representation of web pages, data, or source code used to build web pages. The extracted translatable content is preferably stored in a translation task repository (TTR) accessible by the web developer and the translator. The XML representation is then preferably modified to include selection logic to select the appropriate translations for insertion into the final executable form (e.g. JAVA™ bytecodes). The translator preferably accesses the TTR to translate the appropriate content and saves the translations back to the TTR associated with the original translatable data. The translations are obtained from the TTR as selection-cases for the selection/control logic of the XML representation. As the XML is converted into the executable format, the selection logic and translations are preferably embedded therein facilitating building the web site in multiple different languages. Because XML or similar data-centric computer meta-language-based documents may be compiled into executable form or into new source code for the web site, the dynamic behavior, supported by the executable selection logic on choosing a display language, preferably removes the need for maintaining multiple copies of the same document in multiple languages. Furthermore, because the translatable content is extracted from web pages and stored in a more manageable repository, translators may now preferably focus generally on the translation works and do not typically have to worry about damaging business logic in the codes while doing translations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is a partial code example of a typical JSP/XML document with HTML tags and translatable content;

FIG. 2 is a partial code example of two typical JSP/XML documents supporting two languages for a particular web site;

FIG. 3 is a graphical flowchart that illustrates an embodiment of the present invention for translating a JSP/XML document into a JAVA™ class file;

FIG. 4 is a graphical tree depiction of the JSP/XML document in FIG. 1;

FIG. 5 is a partial code example of a TMX document without translatable content;

FIG. 6 is a partial code example of the TMX document in FIG. 5 after adding translation units based on the JSP/XML document in FIG. 1;

FIG. 7 is a partial code example of the TMX document in FIG. 6 with translations;

FIG. 8 is a graphical tree depiction of a JSP/XML document after adding selection control logic and translations from the TMX document in FIG. 7;

FIG. 9 is a text representation of the graphical tree structure in FIG. 8;

FIG. 10 is an exemplary JAVA™ code snippet generated based on the content shown in FIG. 9.

DETAILED DESCRIPTION OF THE INVENTION

The present invention may be implemented for any type of source document. The concept is to convert a single language source document into an executable injected with multiple, selectable language translations. The system and method may be implemented using any server page technology, such as Sun's JAVA SERVER PAGES™ (JSP), Macromedia's COLDFUSION™, Microsoft's ASP™ (or ASP™.NET), PHP Hypertext Preprocessor (PHP), or the like. Additional embodiments of the present invention may also be implemented directly using a data-centric meta-language, such as XML. The embodiments described herein will note implementation in JSP and/or XML; however, it is not intended and should not be taken to limit implementation of the present invention solely to XML or JSP server page technology. Furthermore, while the embodiments described herein refer to the resulting executable file as a JAVA™ class file, it should be noted that any type of executable, including an .exe file, may be used to implement the present invention.

FIG. 1 is a partial code example of a typical JSP/XML document with HTML tags and translatable content, wherein JSP/XML document 10 includes html tag 100, head tag 101, title tag 102, body tag 103, and paragraph tag 104. Translatable text 105 and 106 also exist in JSP/XML document 10.

In providing an international presence for a web site, there is typically a separate file for each web page in the web site that will contain a different language. For example, FIG. 2 is a partial code example of two typical JSP/XML documents supporting two languages for a particular web site. The English version is saved on file 20, while the Spanish version is saved on file 21. Each time a specific display language is selected for viewing the web site, the specific page corresponding to the selected language must be processed (i.e., either file 20 or file 21 is displayed), to produce the desired web page. The maintenance of multiple copies of the same page wastes valuable space on the web server or other database/server, and creates considerable additional work when elements on any of the particular pages need to be changed and propagated through each of other pages.

FIG. 3 is a graphical flowchart that illustrates an embodiment of the present invention for processing JSP/XML documents, such as JSP document 10 from FIG. 1, into JAVA™ class file 307. The process begins with JSP document 301 or XML document 302 (e.g. FIG. 1) authored by web developers. When beginning with JSP document 301, an application will preferably be used to convert JSP document 301 into an XML representation, as in XML document 302. XML document 302 is preferably a structural depiction or data representation of JSP document 301. Translatable content is preferably extracted from XML document 302 and placed into TMX document 303, as shown in FIG. 6, using an algorithm for detecting the translatable content at the leaves and subtrees of the tree structure. The workflow then splits into two parallel processes. Translators may add translations to turn TMX document 303 into multilingual TMX document 304 (e.g. FIG. 7). When new translations are added in document 304, the document transformation from document 302 to document 305, such as is shown in FIG. 9, will preferably incorporate the new translations. Otherwise, document 305 may use the default content in document 302 for all the languages. Once the multilingual XML document 305 is created, it will preferably be converted or extrapolated into JAVA™ code 306 (e.g. FIG. 10). After compiling or translating JAVA™ code 306 into executable bytecode format, JAVA™ class file 307, the output of document 301 becomes dynamic based on a requested locale and/or language.

Instead of building each web page for each desired language in a web site, the above-described embodiment of the present invention preferably allows an "automated" process for selecting the desired language elements for the specific web page version to be inserted into the underlying structure of the web page design. This feature of the present invention is available through the ability to represent the server page or web page document in a data-descriptive meta-language, such as XML.

Since JSP specification 1.2, JSP documents have been representable in an XML tree structure. Once in the XML format, elements are well-known that may convert a simple XML structure into a document object model (DOM). The XML DOM is an object model that can typically model any XML document regardless of the XML structure of the particular file. The DOM may be represented as the tree structure, such as that shown in FIG. 4. FIG. 4 is a graphical tree depiction of the JSP/XML document in FIG. 1. The tree structure of the DOM corresponds to JSP document 10 of FIG. 1, with translatable content at the edge nodes of content subtrees 401 and 402.

FIG. 5 is a partial code example of TMX document 50 without translatable content. The TMX format is a preferable format for use in the TTR. TMX document 50 is an XML-compliant document format designed by the Localisation Industry Standards Association (LISA) for allowing easier exchange of translation memory data between translation tools and/or vendors with little or no loss of critical data during the process The TMX specification may be found at http://www.lisa.org and is incorporated herein for all purposes.

After running an extraction algorithm to traverse the tree structure of XML DOM 40 in FIG. 4, at least, content subtrees 401 and 402 are identified for translations of the translatable content in the leaves of the tree structure. Preprocessing continues with the linearization of content subtrees 401 and 402. Linearization takes content subtrees, such as 401 and 402, and extracts the translatable content for assembly into a linear translatable segment, as required by the TMX specification. The translatable segment is used to compare for existing translations in the TTR.

FIG. 6 is a partial code example of the TMX document in FIG. 5 after adding translation units based on the JSP/XML document in FIG. 1. TTR 60 includes translatable segments 601 and 602, known in TMX as translation units (<tu></tu>). In operation, after linearizing content subtrees 401 and 402, the resulting linear translation segment is preferably compared to each translation unit segment, such as segments 601 and 602, to determine whether the linear translation segment contains data which has already been translated.

FIG. 7 is a partial code example of the TMX document of TTR 60 in FIG. 6 with translations. If no corresponding translation already exists in TTR 60, the linear translation segment is preferably added. Once the translation segments 601 and 602 have been added to TTR 60, a translator may preferably translate segment into the desired languages (segments 701 and 702). The translator preferably only needs to access TTR 60 to search for new translation requests and will, thus, not have access to the source code. The translator will preferably save the translated file back to TTR 60 when the translation is completed either automatically or manually.

FIG. 8 is a graphical tree depiction of a JSP/XML document after adding selection control logic and translations from the TMX document in FIG. 7. The process of localizing XML DOM 40 (FIG. 4) includes making an infrastructure change to disconnect the static translatable content of content subtrees 401 and 402, as shown in FIG. 6, and preferably replace it with a selection control structure, such as switch-case tag 805 and 806, in order to facilitate automating the exchange of language content, thus, making XML DOM a dynamic document.

As illustrated in FIG. 3, multilingual document 305, in the first iteration, may not contain all the languages it must contain if translations in multilingual TMX document 304 are not completely done. In this situation, a copy of the original content subtree will be used for branches 802 and 804. Document 301 and 302 will be re-processed if they have been modified by web developers or document 304 has been modified by translators.

FIG. 9 is a text representation of the graphical tree structure in FIG. 8. Text tree 90 includes switch statements 900 and 903 for providing selection logic to the executable file. Each of switch statements 900 and 903 contain selectable case translations 901, 902, 904, and 905, respectively. Thus, the executable file with switch statement 900 may preferably select either of case translations 901 and 902 depending on the desired language. Similarly, with switch statement 903, case translations 904 and 905 may also be selected.

FIG. 10 is an exemplary JAVA™ code snippet generated based on the content shown in FIG. 9. JAVA™ code snippet 1000 may be generated by a code-generator for the XML/DOM file or the final JSP representation. JAVA™ code snippet 1000 includes selection logic instructions, switch statements 1001 and 1006. Switch statements 1001 and 1006 preferably select translation cases 1002, 1003, 1007, or 1008, respectively, depending on the specific locale returned from getLocale( ) method 1011. Based on the desired locale, switch statements 1001 and 1006 may preferably select translations 1004, 1005, 1009, or 1010.

It should be noted that in additional embodiments of the present invention, the XML DOM may be converted directly into Java source code without necessity of first converting to a JSP document. It should also be noted that, in additional embodiments of the present invention, the TMX TTR document as shown in FIG. 7 will preferably be used as a part of the pre-processing for many of the JSP/XML pages in an entire web application. It may, therefore, occur that some of the JSP/XML pages may share paragraphs in which case the translations may be shared and reused. This preferably saves translation costs by eliminating duplicate translation requests.

The descriptions presented herein for one or another embodiment of the present invention show partial code examples to illustrate typical or representative code that may be used in implementing such embodiments of the present invention. It should be noted that such partial code examples are merely representative and, in no way, are intended to limit or restrict the present invention to specific code.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, and methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods or steps.

What is claimed is:

1. A method for creating a web page in multiple languages, the method comprising:
   accessing, by a processor, a data-descriptive meta-language representation of a web page;
   in response to accessing, searching, by the processor, said data-descriptive meta-language representation for a translatable content item;
   after locating said translatable content item, accessing, by the processor, a translation task repository for translations corresponding to said translatable content item;
   in response to accessing:
   if said translations, or said translatable content item, are not found in the translation task repository, adding, by the processor, a translation request to the translation task repository, and
   generating, by the processor, a multilingual data-descriptive meta-language representation of the web page using the data-descriptive meta-language representation of the web page and data from the translation task repository, wherein the multilingual data-descriptive meta-language representation includes a plurality of translations for said translatable content item and selection logic for selection of ones of said plurality of translations included in the multilingual data-descriptive meta-language representation; and
   converting, by the processor, said multilingual data-descriptive meta-language representation into an executable file for said web page, wherein said executable file includes said selection logic to generate said web page using selected ones of said translations;
   determining, by the processor, if the translation task repository has been modified; and
   in response to determining that the translation task repository has been modified, again accessing the translation task repository for translations corresponding to said translatable content item and generating an updated multilingual data-descriptive meta-language representation of the web page.

2. The method of claim 1 wherein said data-descriptive metalanguage representation is configured into a tree structure.

3. The method of claim 2 wherein said translatable content item is located at end leaves of said tree structure.

4. The method of claim 2 further including the step of:
   executing, by the processor, an algorithm to search said tree structure for said translatable content item.

5. The method of claim 1 wherein said translatable content item comprises at least one of:
   a content-descriptive tag; and
   text.

6. The method of claim 1 wherein said translation task repository contains translations of text performed by a translator.

7. The method of claim 1 wherein said translations are stored in Translation Memory Exchange (TMX) format.

8. The method of claim 7 further comprising the step of:
   converting, by the processor, said translatable content item into said TMX format when adding said translatable content to the translation task repository.

9. The method of claim 1 wherein said data-descriptive metalanguage comprises extensible markup language (XML).

10. A computer program product comprising a non-transitory computer readable medium embodying program code executable by a computing system, the program code comprising:
    code for compiling a data representation of a web page, wherein said data representation is generated using a computer meta-language;
    code for identifying translatable information within said data representation;
    code for discovering translations corresponding to said identified translatable information in a translation repository;
    code for storing said translatable information onto said translation repository when translations corresponding to said translatable information are not discovered in the translation repository;
    code for generating a multilingual data representation of the web page using said discovered translations and said data representation of the web page generated using a computer meta-language;
    code for including selection logic in said multilingual data representation, the selection logic configured for selecting ones of said translations corresponding to said translatable information; and
    code for building a web page from said multilingual data representation in a desired language responsive to said code for generating,
    wherein said code for compiling includes code for converting a source for said web page into a server page and code for translating said server page to said data representation; and
    wherein said code for building includes code for extrapolating said multilingual data representation into a new server page and code for transforming said new server page to binary executable code for said web page, wherein said binary executable code includes said ones of said translations corresponding to said translatable information.

11. The computer program product of claim 10 wherein said data representation is configured into a data tree.

12. The computer program product of claim 11 wherein said translatable information is located at edge nodes of said data tree.

13. The computer program product of claim 11 further including:
    code for executing a search algorithm to traverse said data tree for said translatable information.

14. The computer program product of claim 10 wherein said translatable information comprises at least one of:
   a format-sensitive tag; and
   text.

15. The computer program product of claim 10 wherein said translation repository contains translations of text performed by a translator.

16. The computer program product of claim 10 wherein said
   translations are stored on said translation repository in Translation Memory Exchange (TMX) format.

17. The computer program product of claim 16 further comprising:
   code for converting said translatable information into said TMX format when said translatable information is to be stored on said translation repository.

18. The computer program product of claim 10 wherein said computer meta-language comprises extensible markup language (XML).

19. A method for creating a page in multiple languages, the method comprising processor-implemented steps of:
   accessing a data-descriptive meta-language representation of a page;
   in response to accessing, searching said data-descriptive meta-language representation for translatable content items;
   after locating said translatable content items, accessing a translation repository for translations corresponding to said translatable content items;
   in response to accessing:
   for those of said translations or said translatable content items are not found in the translation repository, adding a translation request to the translation repository, and
   generating a multilingual data-descriptive meta-language representation of the page using the data-descriptive meta-language representation of the page and data from the translation repository,
   wherein the multilingual data-descriptive meta-language representation includes a plurality of translations for the translatable content items and selection logic for selection one or more of the plurality of translations included in the multilingual data-descriptive meta-language representation;
   converting said multilingual data-descriptive meta-language representation into an executable file for said page, the executable file including said selection logic to generate said page in selected ones of said translations;
   determining, by the processor, if the translation repository has been modified; and
   in response to determining that the translation repository has been modified, again accessing the translation repository for translations corresponding to said translatable content items and generating an updated multilingual data-descriptive meta-language representation of the page.

20. The method set forth in claim 19, wherein the data-descriptive meta-language representation comprises extensible markup language (XML).

21. The method set forth in claim 20, further comprising:
   generating the data-descriptive meta-language representation from a server page prior to accessing.

22. A computer program product comprising a nontransitory computer readable medium embodying program code executable by a processing system, the program code comprising:
   program code for searching a meta-language representation of a page for a translatable content item, the meta-language representation comprising extensible markup language (XML);
   program code for accessing, after locating said translatable content item, a translation repository for translations corresponding to said translatable content item;
   program code for adding, in response to accessing, a translation request to the translation repository if a translation corresponding to said translatable content item is not found,
   program code for generating, in response to accessing, a multilingual meta-language representation of the page using the meta-language representation of the page and data from the translation repository,
   wherein the multilingual meta-language representation includes a plurality of translations for the translatable content item and selection logic for selection one or more of the plurality of translations included in the multilingual meta-language representation;
   program code for determining if the translation repository has been modified;
   program code for acting, in response to determining that the translation repository has been modified, to again access the translation repository for translations corresponding to said translatable content item and to generate an updated multilingual meta-language representation of the page, and
   program code for converting said multilingual meta-language representation into an executable file for said page, the executable file including said selection logic to generate said page in selected ones of said translations.

\* \* \* \* \*